G. C. BOVEY.
Window-Cleaner.
No. 214,548. Patented April 22, 1879.
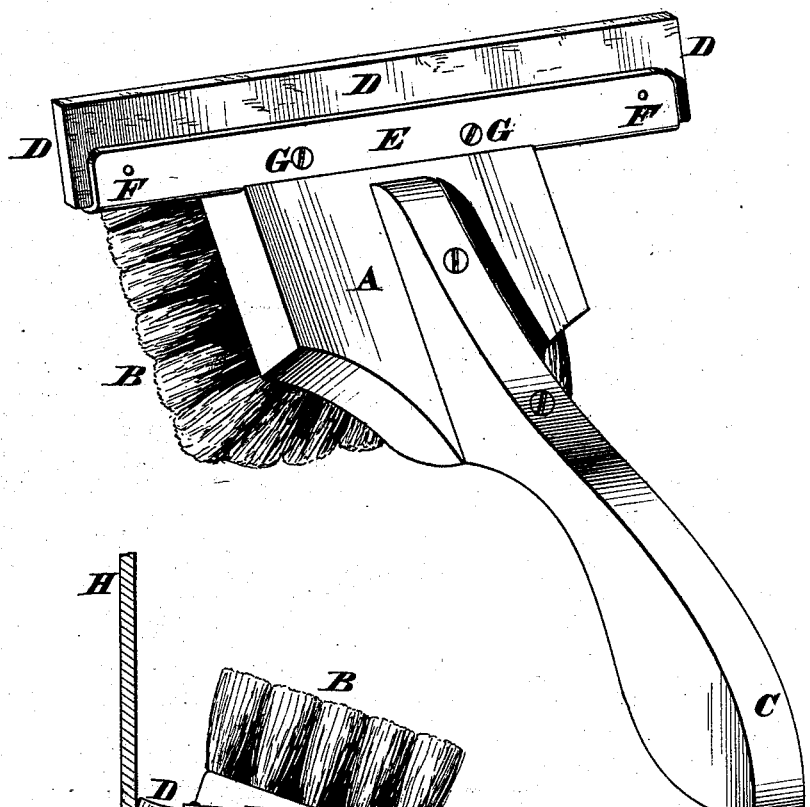
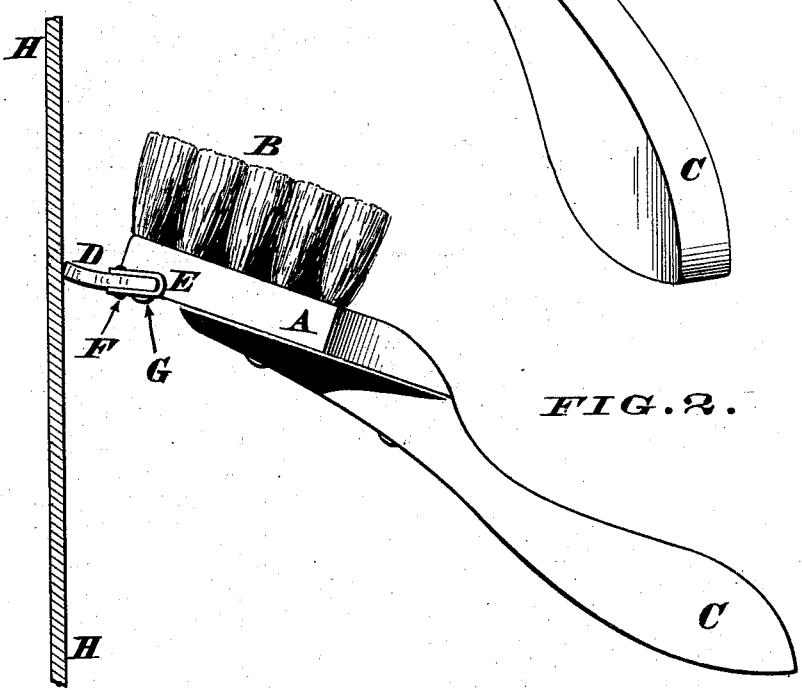

UNITED STATES PATENT OFFICE.

GEORGE C. BOVEY, OF COLUMBUS, OHIO, ASSIGNOR TO ABNER WOODWARD, OF SHELBURNE FALLS, MASSACHUSETTS.

IMPROVEMENT IN WINDOW-CLEANERS.

Specification forming part of Letters Patent No. 214,548, dated April 22, 1879; application filed February 17, 1879.

*To all whom it may concern:*

Be it known that I, GEORGE C. BOVEY, of Columbus, Franklin county, Ohio, have invented a new and useful Window-Cleaner, of which the following is a specification.

This invention relates to that class of scrubbing-brushes which have india-rubber strips or wipers applied to their free ends; and my improvement comprises a novel method of attaching such strips or wipers to the stock of the implement. The strip is firmly riveted within a folded clip-plate or keeper, which latter is then secured to the back of the brush. By this arrangement the wiper is allowed to project laterally or beyond the edges of the stock or brush proper, while at the same time the folded clip-plate imparts sufficient stiffness to the wiper to prevent these lateral projections being bent or otherwise injured by constant use. Furthermore, this construction enables the ready application of the wiper to an ordinary scrubbing-brush, and thereby obviates the necessity of a special form of the latter for the reception of said wiper.

In the annexed drawings, Figure 1 is a perspective view, showing my implement adapted for use as a window-scrubber, and Fig. 2 represents it in position for use as a wiper.

A represents a stock or brush-board, which stock is preferably rectangular in shape, and is furnished with customary bristles B and handle C. The free end of this stock carries a wiper, D, composed of india-rubber or any other suitable elastic material or materials. The edge of this wiper is secured within a sheet-metal clip-plate or binder, E, rivets F F being employed for fastening said wiper and binder together. By this arrangment I am enabled to project said wiper to any desired extent on either side of the stock, and thereby increase the efficiency of the implement.

G G are screws, wherewith this wiper and its stiffening-plate E are secured to the stock A, said plate being in some cases seated in a rabbet in the back of the latter, or else applied to a kerf in the end of the same.

For scrubbing purposes the bristles B are employed in the usual manner, the rectangular shape of stock A enabling the brush to work up snugly in the angles of the window-sashes, and without bringing the wiper D in contact with the latter. The dirt having been thus loosened, the brush is inverted, and wiper D is now brought to bear against the window-pane H with a slight degree of force. (See Fig. 2.)

Owing to the elastic or yielding nature of device D considerable adhesion takes place between it and the glass H, and, consequently, as the former is drawn down against the surface of the latter, the previously-loosened dirt is wiped off in the most thorough and uniform manner, one or two strokes of the implement being all that is necessary to wipe the largest panes.

Wiper D, instead of being composed of a single piece of india-rubber, may be made of several sheets or layers of the same with any yielding filling interposed between them. Finally, it is evident this wiper D E F F may be readily applied to any ordinary form of scrubbing-brush.

I am aware it is not new to furnish scrubbing-brushes with india-rubber strips similar to the one D herein described, and therefore I do not wish to be understood as attempting to claim such devices, broadly, but limit myself to the wiper when secured within a recurved or folded clip-plate or keeper, which latter is attached to the back of the brush, and projects laterally therefrom, as seen in Fig. 1.

I claim as my invention—

The flexible window-cleaner D, having one of its edges permanently secured within the folded clip-plate E by rivets F F', and capable of being readily attached to and detached from a brush by means of screws G, as herein described, and for the purpose set forth.

In testimony of which invention I hereunto set my hand.

GEO. C. BOVEY.

Witnesses:
 JAMES H. LAYMAN,
 GEORGE H. KOLKER.